(12) United States Patent
Bray

(10) Patent No.: US 7,139,031 B1
(45) Date of Patent: *Nov. 21, 2006

(54) AUTOMATED LANGUAGE FILTER FOR TV RECEIVER

(75) Inventor: J. Richard Bray, Rogers, AR (US)

(73) Assignee: Principle Solutions, Inc., Rogers, AR (US)

( * ) Notice: Subject to any disclaimer, the term of this patent is extended or adjusted under 35 U.S.C. 154(b) by 762 days.

This patent is subject to a terminal disclaimer.

(21) Appl. No.: 10/041,360

(22) Filed: Jan. 7, 2002

Related U.S. Application Data

(63) Continuation-in-part of application No. 09/949,379, filed on Sep. 6, 2001, now Pat. No. 6,972,802, which is a continuation-in-part of application No. 09/748,715, filed on Dec. 21, 2000, now Pat. No. 6,867,818, which is a continuation-in-part of application No. 08/954,950, filed on Oct. 21, 1997, now Pat. No. 6,166,780, said application No. 10/041,360.

(60) Provisional application No. 60/260,109, filed on Jan. 5, 2001.

(51) Int. Cl.
H04N 3/24 (2006.01)
G10L 21/00 (2006.01)

(52) U.S. Cl. ................ 348/468; 348/632; 704/275; 725/25

(58) Field of Classification Search ........... 348/460, 348/468, 478, 632, 633; 704/275; 725/25; *H04N 3/24*
See application file for complete search history.

(56) References Cited

U.S. PATENT DOCUMENTS

| | | | |
|---|---|---|---|
| 4,229,765 A | 10/1980 | Sanger | 358/188 |
| 4,305,101 A | 12/1981 | Yarbrough et al. | 360/69 |
| 4,404,566 A | 9/1983 | Clark et al. | 346/1.1 |
| 4,554,584 A | 11/1985 | Elam et al. | 358/165 |
| 4,605,964 A | 8/1986 | Chard | 358/147 |
| 4,605,973 A | 8/1986 | Von Kohorn | 358/335 |
| 4,739,398 A | 4/1988 | Thomas et al. | 358/84 |
| 4,750,213 A | 6/1988 | Novak | 455/67 |
| 4,888,796 A | 12/1989 | Olivo, Jr. | 379/101 |
| 4,930,160 A | 5/1990 | Vogel | 380/23 |
| 5,172,111 A | 12/1992 | Olivo, Jr. | 340/825.31 |
| 5,189,630 A | 2/1993 | Barstow et al. | 364/514 |
| 5,195,135 A | 3/1993 | Palmer | 380/20 |
| 5,199,077 A | 3/1993 | Wilcox et al. | 381/43 |

(Continued)

*Primary Examiner*—Michael H. Lee
(74) *Attorney, Agent, or Firm*—Keisling Pieper & Scott PLC; Trent C. Keisling; David B. Pieper

(57) ABSTRACT

A method and apparatus for use in connection with home television receivers involving processing an electronic signal, including audio and video processors; the audio information, including digital representations thereof, is analyzed and modified to compare words and phrases represented in the audio information with words and phrases stored in electronic memory for elimination of undesirable words or phrases in audible or visible representations of the audio with options for replacing undesirable words with acceptable words. The options include varying degrees of selectivity in specifying words as undesirable and control over substitute words which are used to replace undesirable words. The options for control of the method and apparatus for language filtering are selectable from an on-screen menu through use of a conventional television remote transmitter. Full capability of the method and apparatus depends only on presence of closed caption or similar digitally-encoded language information being received with a television signal special instructions transmitted with a television signal may also be responded to for activating particular language libraries customizing a library for the program material, as well as unrelated viewer information and control functions.

14 Claims, 5 Drawing Sheets

U.S. PATENT DOCUMENTS

| | | | |
|---|---|---|---|
| 5,327,716 A | 7/1994 | Giffin, III et al. | 60/39.02 |
| 5,343,251 A | 8/1994 | Nafeh | 348/571 |
| 5,369,440 A * | 11/1994 | Sussman | 725/28 |
| 5,371,795 A | 12/1994 | Vogel | 380/23 |
| 5,387,942 A | 2/1995 | Lemelson | 348/474 |
| 5,408,273 A | 4/1995 | Okamura | 348/632 |
| 5,418,621 A | 5/1995 | Park | 358/335 |
| 5,434,678 A | 7/1995 | Abecassis | 358/342 |
| 5,446,488 A | 8/1995 | Vogel | 348/3 |
| 5,477,277 A | 12/1995 | Shimoyanagida et al. | 348/632 |
| 5,484,518 A | 1/1996 | Goldberg | 205/166 |
| 5,485,219 A | 1/1996 | Woo | 348/460 |
| 5,508,731 A | 4/1996 | Kohorn | 348/1 |
| 5,543,851 A | 8/1996 | Chang | 348/468 |
| 5,555,441 A | 9/1996 | Haddad | 455/4.2 |
| 5,561,457 A | 10/1996 | Cragun et al. | 348/13 |
| 5,572,260 A | 11/1996 | Onishi et al. | 348/460 |
| 5,583,576 A | 12/1996 | Periman et al. | 348/460 |
| 5,589,945 A | 12/1996 | Abecassis | 386/83 |
| 5,610,653 A | 3/1997 | Abecassis | 348/110 |
| 5,634,849 A | 6/1997 | Abecassis | 463/30 |
| 5,659,366 A | 8/1997 | Kerman | 348/460 |
| 5,664,046 A | 9/1997 | Abecassis | 386/125 |
| 5,668,917 A | 9/1997 | Lewine | 386/52 |
| 5,684,918 A | 11/1997 | Abecassis | 386/83 |
| 5,692,093 A | 11/1997 | Iggulden et al. | 386/46 |
| 5,696,866 A | 12/1997 | Iggulden et al. | 386/46 |
| 5,696,869 A | 12/1997 | Abecassis | 386/52 |
| 5,697,844 A | 12/1997 | Von Kohorn | 463/40 |
| 5,703,655 A | 12/1997 | Corey et al. | 348/468 |
| 5,713,795 A | 2/1998 | Kohorn | 463/17 |
| 5,717,814 A | 2/1998 | Abecassis | 386/46 |
| 5,724,472 A | 3/1998 | Abecassis | 386/52 |
| 5,751,335 A | 5/1998 | Shintani | 348/5.5 |
| 5,759,101 A | 6/1998 | Von Kohorn | 463/40 |
| 5,778,135 A | 7/1998 | Ottesen et al. | 386/52 |
| 5,784,522 A | 7/1998 | Yamamura | 386/46 |
| 5,813,010 A | 9/1998 | Kurano et al. | 707/100 |
| 5,828,402 A | 10/1998 | Collings | 348/5.5 |
| 5,835,843 A | 11/1998 | Haddad | 455/4.2 |
| 6,075,550 A * | 6/2000 | Lapierre | 725/25 |
| 6,166,780 A | 12/2000 | Bray | 348/632 |
| 6,553,566 B1 * | 4/2003 | Grant et al. | 725/28 |

* cited by examiner

AUTOMATED LANGUAGE FILTER FOR TV RECEIVER

CROSS-REFERENCE TO RELATED APPLICATIONS

This application claims priority to and is a continuation-in-part of U.S. application Ser. No. 09/949,379, filed Sep. 6, 2001 now U.S. Pat. No. 6,972,802, which is a continuation-in-part of U.S. application Ser. No. 09/748,715, filed Dec. 21, 2000 now U.S. Pat. No. 6,867,818, which is a continuation-in-part of U.S. application Ser. No. 08/954,950, filed Oct. 21, 1997, now U.S. Pat. No. 6,166,780 issued Dec. 26, 2000. This application also claims priority to U.S. Provisional Application Ser. No. 60/260,109, filed Jan. 5, 2001.

FIELD OF THE INVENTION

The present invention relates to accessories for home television which allow one to eliminate objectionable material from broadcast television, cable television, video tapes, video disks, or DVD programming. Among the established technology in this field is a program-blocking accessory generally referred to as a V-chip. This long available but not widely used device relies on mandated rating codes such as PG, R, and the like, incorporated in television material. The V-chip is generally incorporated in a television set for the purpose of allowing parents to program the V-chip to block entire programs that are rated as offensive or unsuitable to children according to the rating system. The V-chip blocks out an entire program (audio and video) if its rating code exceeds an allowable rating code selected by the parents. Even unobjectionable portions of the program would not be seen. Generally, the V-chip does not work with video movies that you rent or buy.

A more-recent development is the language filter which does not seek to evaluate or block the graphic material of the video and concentrates solely on removing foul or otherwise offensive language from the audio portion (and also from the closed caption text of the audio portion). See U.S. Pat. No. 6,166,780.

BACKGROUND OF THE INVENTION

Television communications over the years has become an everyday part of existence in the United States and abroad. These communications include a wide range of words and phrases. Some of the viewers of these communications would prefer that some specific words or phrases not be utilized. Viewers of these programs would like to view these programs but without having to be exposed to undesirable words or phrases. In order to meet this need, the viewing audience needs a means for automatically identifying specific words and/or related phrases and muting such words or phrases without affecting the video portion of the television or video signal.

TV program control includes different forms. One form discloses methods of identifying and subsequent blocking out of video signals. U.S. Pat. No. 5,484,518 by Hunter et al. discloses a method and apparatus for the recognition of electronic television broadcast programming and for a choice among available programs. It allows the user to lock out or block out all programs that have not been determined to be suitable to be viewed by all family members. These types of parental control devices work off principles of the time and codes. The devices block a television signal, both video and audio portions, during specific time frames and which have specific rating pursuant to an established rating code. This type of device does not allow the viewer to view the program.

Another program control relates to the splitting of the audio and video portions of the television broadcast signal. U.S. Pat. No. 5,408,273 for Okamura discloses a circuit which causes the closed captioned data contained within the video portion of the television signal to be displayed when the muting function of the audio portion of the signal has been activated (see also U.S. Pat. No. 5,327,716 for Foyler, et al.). This device focuses on displaying the closed captioned data when the audio portion of a signal is muted. This device is an aid when the viewer manually activates the muting function of a television set. It does not act as a monitor of the content of the video or audio portion of the television signal.

U.S. Pat. No. 6,075,550 to La Pierre filed subsequent to a parent of this application discloses a system which includes means for editing television audio in a manner different from that of the present disclosure.

The ability to choose what is appropriate for the family is becoming more and more important. Common previous systems involve either a method of blocking out an entire program and thus missing important unobjectionable information or manually muting a selected audio portion and possibly displaying the closed captioned text, such closed captioned data would still include, and thus display, specific undesired information on the screen. There is a need to mute certain words or phrases while at the same time not affecting the video portion of the signal displaying only a modified closed caption signal, all under specific control of a parental supervisor.

BRIEF SUMMARY OF THE INVENTION

According to the present invention, a particularly effective form of automatic language filter is provided in a small, convenient unit which is connected between an input of a television receiver or monitor and the source of the video programming such as a VCR, DVD, cable box, satellite antenna, or the like. The language filter according to the invention has numerous capabilities beyond merely blocking certain portions of the audio and it does not rely on rating codes in the program material and accordingly is effective in processing program material on rented or purchased video tapes for which the V-chip rating code control is ineffective. The language filter of the invention takes the form of computer electronics and other electronics that connects between television receiver or monitor and program source, a VCR or antenna, for example. The language filter continually monitors the closed captioning embedded in the video signal of broadcast programs or video movies (or similar text data as subtitles in either digital or analog video signals). It can be employed with a DVD or other video program source as well as a VCR. It can also be incorporated in the electronics of a TV, VCR, DVD, etc.

The language filter references each word in the closed caption against the internal libraries of over 100 offensive words and phrases. When an offensive word is detected, the filter is operative to modify both the audio corresponding to the closed caption and to modify the closed caption itself.

The language filter is provided with multiple libraries so that it can provide different levels of filtration involving obscenity, vulgarity, and profanity; foreign language capability may also be provided.

Optional features and advantages of the language filter according to the invention include the capability for handling surround audio with three or more sound channels by modifying left, right, and center signals; the capacity to include non-English language libraries, as well as English libraries; a controller with an on-screen menu for designating words for particular libraries appropriate for strict, moderate or other degrees of control, or selection of non-English language libraries. Also, the degree to which the closed caption text is displayed in the course of the program is a selectable option. Other optional features include a speech synthesizer which allows an audio switch in the unit to switch in a sanitized audio speech portion to replace a closed caption block with an objectionable word or phrase in it, rather than muting the audio during that portion. Another optional feature is a speech-recognition unit which operates with or in place of a closed caption editor to recognize words in the audio directly rather than in the closed caption text. Another optional feature is a variable delay for the audio and video to allow better synchronization with the original audio or derived speech recognition synthesized text.

In addition to providing the above features and advantages, it is an object of the present invention to facilitate parental control over the content of television material in varying degrees as they choose without blocking the video signal or affecting the program content other than the language that is used in the material.

It is another object of the present invention to incorporate multiple virtual libraries of offensive or undesirable words which the user can reassign among the libraries, thereby allowing greater discretion in the use of parental control in terms of blocking obscene, crude, or profane language.

It is another object of the present invention to provide the option of communicating phrases with undesirable words removed or replaced in closed caption text on the screen and/or in voice synthesized versions of such text incorporated in the audio.

It is another object of the present invention to facilitate user selection of options by incorporation of an on-screen menu controllable by a TV remote.

Another object of the invention is to mute unacceptable words or phrases at the time of a broadcast of a television signal or at the time when a signal has been received from a storage device such as a video cassette recorder. The processing time in which to analyze the closed caption portion of the video signal is minimal. Thus, the muting affect will occur at or near the time in which the video portion of the signal is displayed on the receiver's screen.

Another object of the invention is to provide a device which operates with technology currently available. The invention is based on the closed caption data (or subtitles or digital data) which are embedded into or associated with the video portion of television and video signals. Most of the signals transmitted either via the television broadcast networks or other video players embed closed caption data. By utilizing closed caption data or subtitles, the present invention is able to operate without having the need to develop new standards or devices.

Another object of the invention is to provide the user with options regarding the level of tolerance regarding the amount of words or phrases which will be subject to the muting aspect of the invention. To some users, a specific word is not offensive while at the same time, that word is considered to be unacceptable. By providing a means for selecting sub-library content for selection of replacement words just like different levels of tolerance, the present invention allows users to utilize the invention pursuant to their own personal desires by redefining sub-library content by selecting words from the master library.

Another object of the invention is to provide the user with options regarding the levels of displaying the modified closed captioned data. The present invention allows the viewer the option of seeing the entire modified and unmodified closed caption text, seeing only the modified closed captioned text during mute, or not seeing any closed captioned text at all. Other objects and advantages will be apparent from consideration of a following description and the appended drawings as described below.

BRIEF DESCRIPTION OF THE SEVERAL VIEWS OF THE DRAWING

Referring to FIG. 1, the automatic language filter 2 is supplied with conventional video and audio signals from a VCR or DVD 3. It is understood that the source of these signals may be a videotape of a movie or the like, a DVD movie disk, or a cable or broadcast television program received by the VCR. The VCR/DVD has video output 5 connected to video input 10 of the language filter and has one or more of left, center and right outputs 7, 8, and 9 connected to audio inputs 12, 13, and 14 of the language filter. The association with a VCR is convenient, but the language filter circuitry may be incorporated within a TV receiver as illustrated in FIG. 5.

Figure 1:
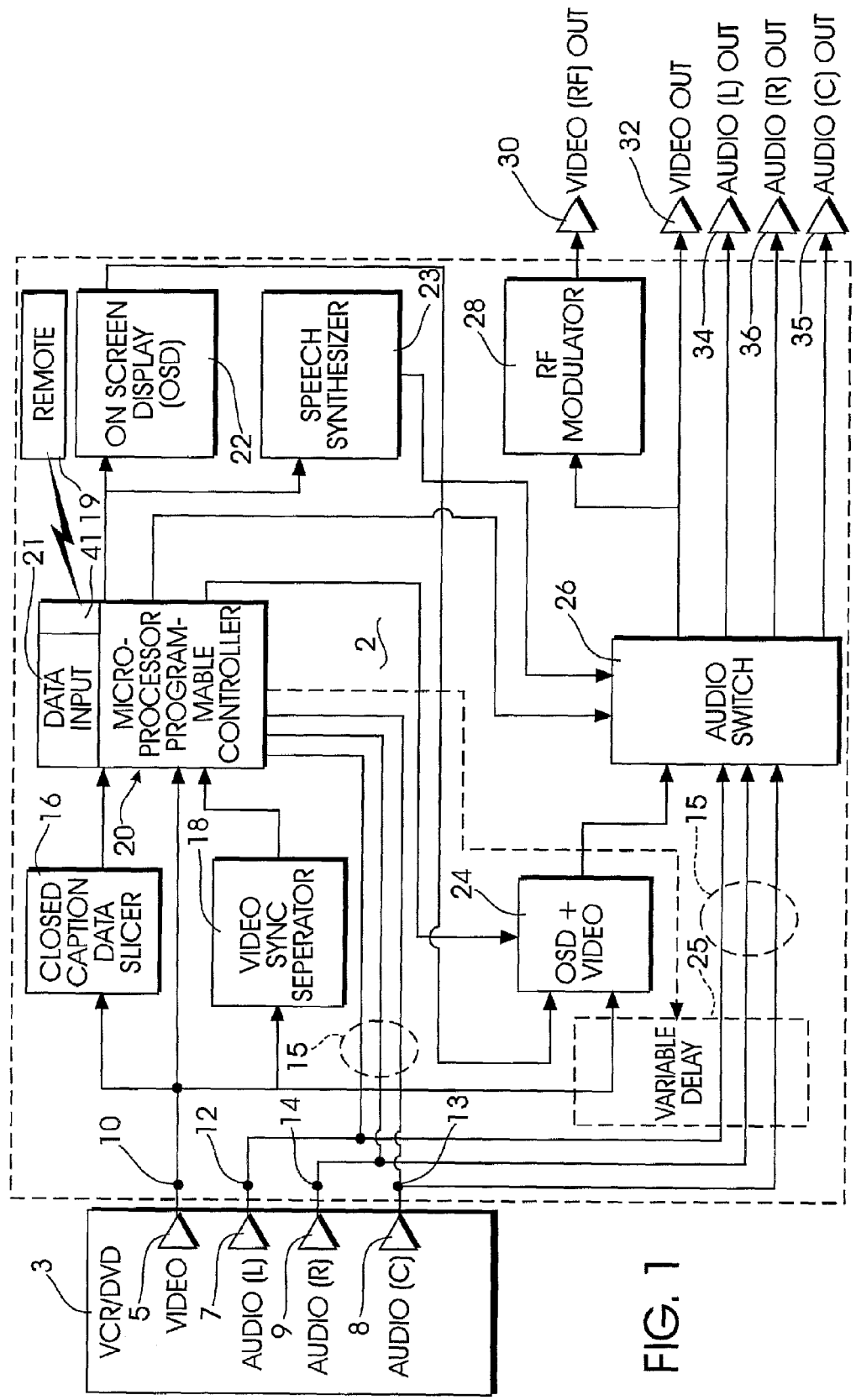
FIG. 1 is a schematic block diagram of an automatic language filter having improvements and optional features according to the invention.

A closed caption data slicer 16, a video sync separator 18, and an OSD plus video combiner 24 receive the video signal from input 10. These are all known, conventional components utilized in the television art. Basically, the closed caption data slicer is a device which decodes digital control and closed caption text signals, usually found in the television retrace intervals. It will be understood that this embodiment is designed for use with current analog TV technology. With digital technology, closed caption data slicer 16 would be unnecessary and other components are employed for compatibility with digital technology standards. Also American standards (NTSC) for analog TV are implied, but PAL or other standards could readily be accommodated.

Video sync separator 18 captures the standard synchronizing signals of the video and provides them to a microprocessor programmable controller 20 which also receives the closed captioned data from the closed caption data slicer 16 and optionally may receive the unprocessed video signal from input 10. Microprocessor programmable controller 20 also optionally receives left, center and right inputs from terminals 12, 13, and 14 which are collectively labeled audio input 15.

Microprocessor programmable controller 20 has a data input unit 21 which through an infrared receiver or other receiving device has the capability of receiving command signals from a television remote or other source to facilitate the user in electing various options for selective control of the language filter. A television remote is indicated at 19.

It should be pointed out that FIG. 1 (and also FIG. 2) has communication paths with arrows to aid in understanding of the function of the apparatus, but these communication paths are not to be considered to be mono-directional as they will be bi-directional in those cases where necessary or desirable to the function of the system.

The microprocessor programmable controller 20 has outputs to an onscreen display 22, a speech synthesizer 23, an audio switch 26, and an OSD plus video combiner 24. It also has an output to an optional variable delay unit 25 (as shown in dashed lines) if desired.

The output of onscreen display 22 is provided to OSD plus video combiner 24, the output of which is routed through audio switch 26 to video output 32. Audio switch 26 in the preferred embodiment has no effect on this video signal in the video path leading to video output 32.

As an optional feature, a speech synthesizer 23 is provided which produces an audible voice representation of the modified closed caption signal and such audible representation is provided to audio switch 26, making it possible to switch in an audible representation of the modified closed caption segment in the audio path rather than simply muting the audio signal.

An audio path indicated at 15 permits the left, right and center audio inputs indicated at 12, 14, and 13 to proceed to audio switch 26, and thence to left, right and center audio outputs 34, 36, and 35. Use of the center audio output 35 is optional.

An RF modulator 28 may be provided to supply an appropriate RF input signal to a television set which does not have suitable video and audio input jacks to receive the outputs from video and audio outputs 32, 34, and 36. Also, the audio outputs 34, 35, and 36 may be provided in a form that facilitates direct connection to a high-fidelity sound system and may include a ground terminal or other appropriate connector elements not shown in FIG. 1.

Figure 2:
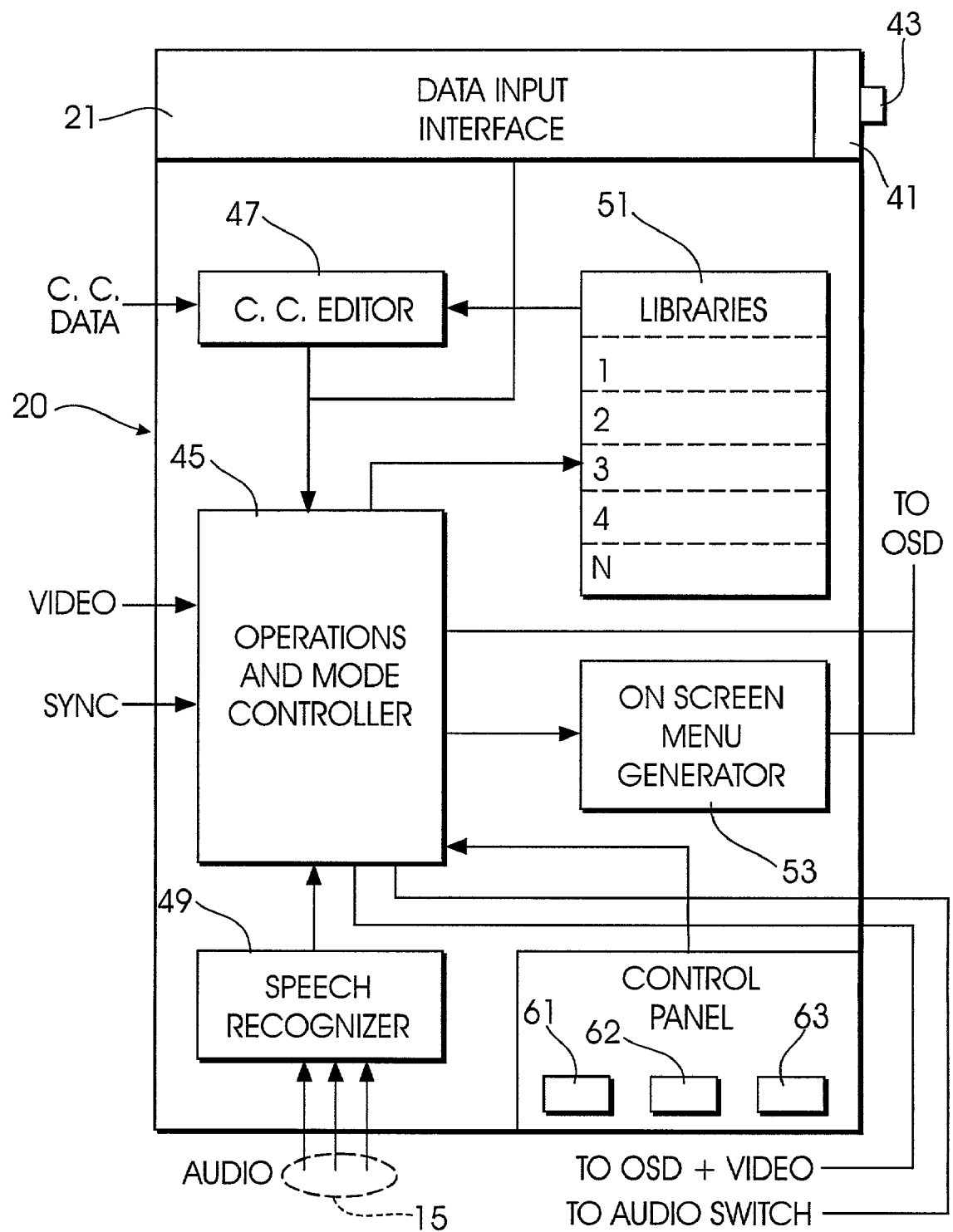
FIG. 2 is a schematic block diagram showing details of the microprocessor programmable controller element shown in FIG. 1.

Referring now to FIG. 2, details of microprocessor programmable controller 20 are shown. Data input interface 21 includes an infrared receiver 41 having a sensor 43 to receive signals transmitted from remote 19 (not shown in FIG. 2). Data input interface 21 provides data to operations and mode controller 45 which thereby is responsive to commands by the user transmitted by use of the remote 19. Operations and mode controller 45 is also preferably provided with the video signal from video input 10 and the video signal from video sync separator 18. In an alternative embodiment, the operations and mode controller 45 is provided with programming and mode control instructions from a VCR or DVD through video input 10. For example, a video tape may have a preliminary segment of binary-coded information to instruct the operations and mode controller regarding which levels of editing are appropriate or may even provide data for a special word/phrase library appropriate for the particular material. The operations and mode controller may direct data which is input to it through the video or from other sources either directly or with operational modifications to other units in the automatic language filter 2.

It will be understood that closed caption editor 47 uses conventional data processing techniques to access undesirable words or phrases stored in at least a first library memory and compare characters of closed caption segments with characters of such undesirable words or phrases for detection thereof. There may be a second library memory having additional undesirable words not present in the first library memory and operation and mode controller 45 is adapted to provide greater or lesser numbers of undesirable words or phrases from said libraries to said closed caption editor 47 for operation thereof. Substitute inoffensive words are contained in a library memory with reference pointers to undesirable words or phrases that should be replaced by operation of closed caption editor 47.

As an optional feature, a speech recognizer 49 is provided which receives audio from the audio path 15 and provides binary code to the operations and mode controller 45 which in its most sophisticated form could substitute for text to be operated on by the closed caption editor 47 or a functionally equivalent editor to provide a modified text transcript with objectionable words and phrases removed or substituted by acceptable words or phrases. This text transcript would then be available to send to on-screen display 22 and/or speech synthesizer 23 as modified closed caption text would be if available.

Speech recognizer 49 can be assigned a less-demanding function to aid in synchronizing the operation of audio switch 26 to better mute or replace objectionable speech corresponding to that found by the closed caption editor.

A control panel 55 may be provided for user input without employment of a TV remote 19. The illustrated embodiment of control panel 55 is shown with three user-control buttons 61, 62, and 63 (although more buttons could be added if desired). The buttons 61, 62, and 63 of control panel 55 may be typically assigned to have the center button 62 call up the menu produced by on-screen menu generator 53 while left button 61 toggles the various modes available and right button 63 toggles the options within each mode. A simple menu may lead to pages for PIN access control, quick select of common options, language filter settings, detailed language filter settings, customized word lists (change tag between strict, moderate, etc., select replacement word), or closed caption visibility. Modes and options selectable by the user from the control panel may also be selectable by the user with the TV remote 19 with its accessory control function. As previously mentioned, on-screen generator 53 receives signals from other elements of the microprocessor programmable controller 20 through operations and mode controller 45 to provide the user with control information by display on the television monitor. The details shown in FIG. 2 in part may be applied to FIG. 5 also.

Figure 3:
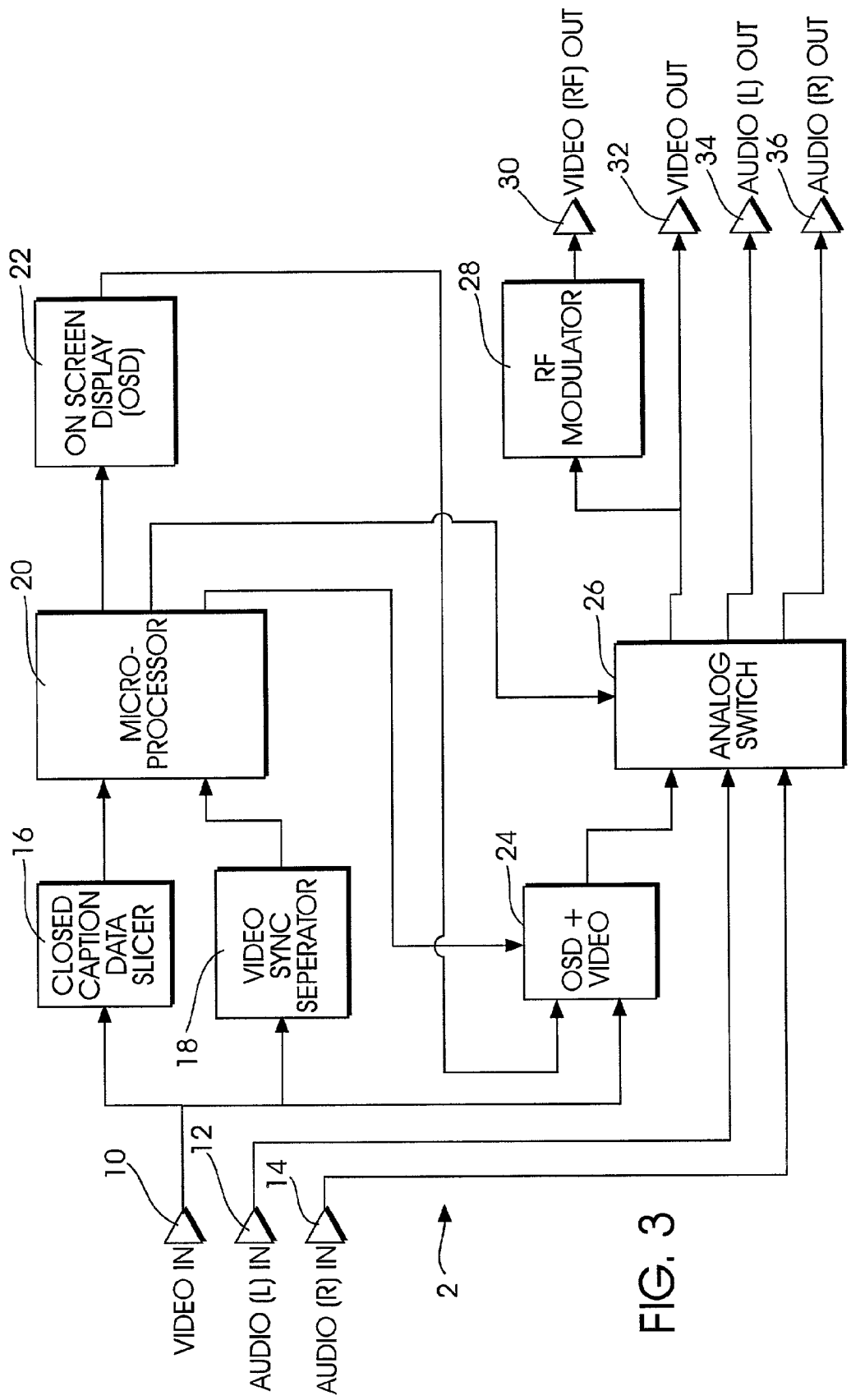
FIG. 3 is a schematic block diagram of a basic automatic language filter in accordance with the embodiments of the present invention.
Figure 4:
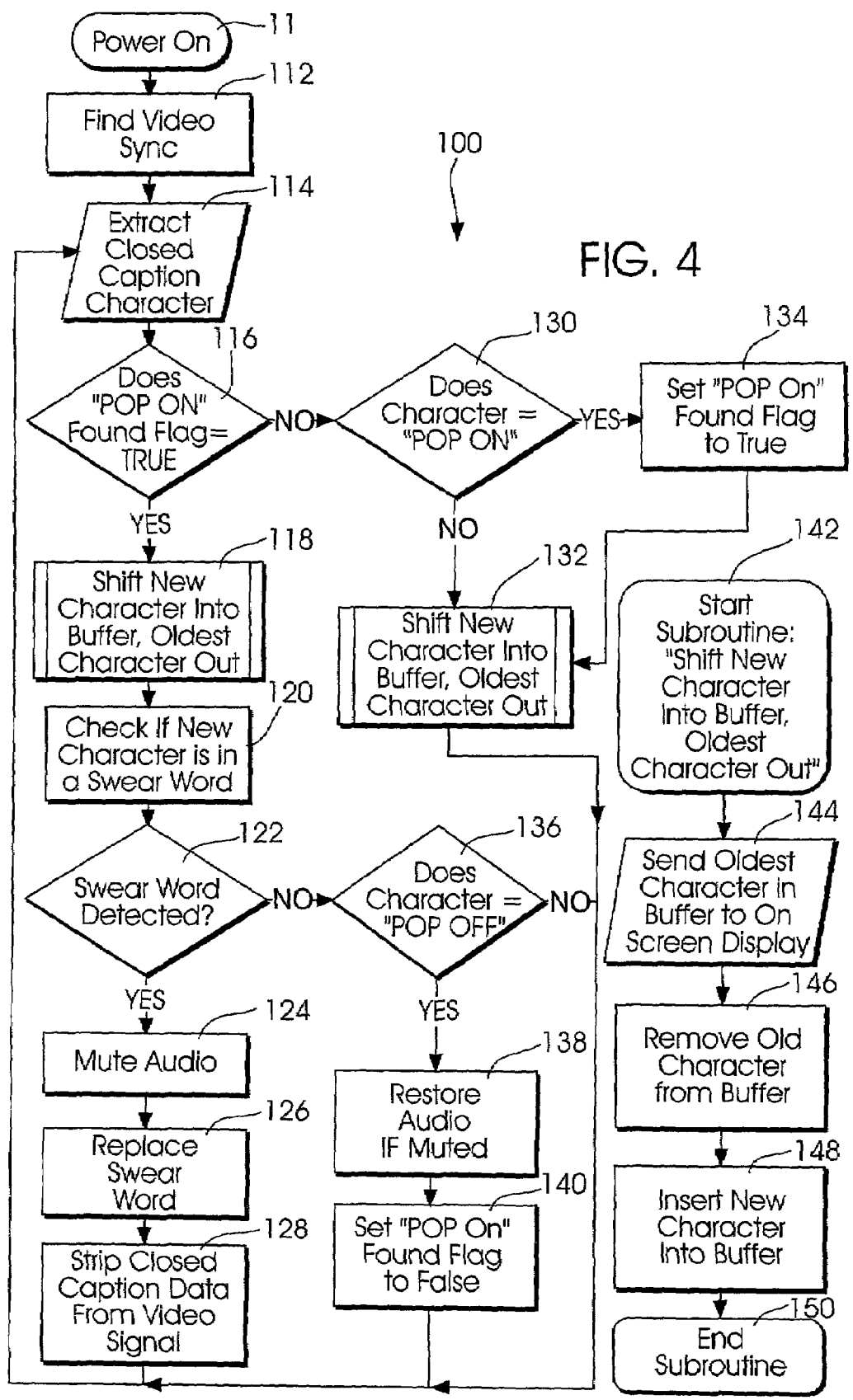
FIG. 4 is a flow diagram of the automatic language filter of FIG. 3.

It will also be helpful to understand the invention to refer to a basic implementation illustrated in FIGS. 3 and 4, referring to FIG. 3, a language filter in accordance with the invention comprises a video input 10, an audio (Left) input 12, an audio (Right) input 14, a closed captioned data slicer 16, a video-sync separator 18, a micro-processor 20, an on-screen display (OSD) 22, an OSD+Video 24, an analog switch 26, an RF modulator 28, a video (RF) out 30, a video out 32, an audio (Left) out 34, and an audio (Right) out 36.

When a video portion of the television signal is received in video input 10 the closed captioned data contained therein is extracted and separated from the video feed by closed caption data slicer 16. That information is then analyzed to see if inappropriate words or phrases are contained therein by microprocessor 20. This analysis is performed by comparing the closed caption data against a library or sub-library of words and phrases stored within the microprocessor's memory. If any word or phrase is determined to be inappropriate a signal is sent to analog switch 26 to mute the audio portion of the signal as received in audio (Left) input 12 and audio (Right) input 14.

After a word or phrase is determined to be inappropriate, the microprocessor then strips the offensive word or phrase from the closed caption data. A replacement word or phrase is then inserted into the closed caption data.

On-screen display (OSD) 22 responds to signals received from microprocessor 20. OSD+Video 24 then superimposes the signals from OSD 22 upon the video signal received from microprocessor 20. The audio and video portions of the signal are then available to the viewer by the means of video (RF) out 30, video out 32, audio (Left) 34, and audio (Right) out 36.

The above described functions of microprocessor 20 can be performed under appropriate software control. FIG. 4 shows a flowchart illustrating an approach to the microprocessor 20 analysis of the signal as received by video in 10. The microprocessor 20 enters the routine at step 112. The closed caption data is extracted at step 114 by closed captioned data slicer 16. This data is in the form of a pair of characters. Microprocessor 20 looks for the specific code POP-ON within these characters. If the code POP-ON is detected, microprocessor compares the specific closed caption data with a list of undesirable words or phrases at step 122. If an undesirable word or phrase is detected, a command is sent from microprocessor 20 to analog switch 26 to mute audio portion of the signal at step 124. Microprocessor 20 then replaced the undesirable word or phrase with a more acceptable one at step 126. The closed caption data is then striped from the video signal by microprocessor 20 at step 128. The routine is then reset awaiting the next set of extracted closed captioned characters for muting only. If the filter is on, the closed captioned text will be modified regardless at the closed captioning made.

Figure 5:
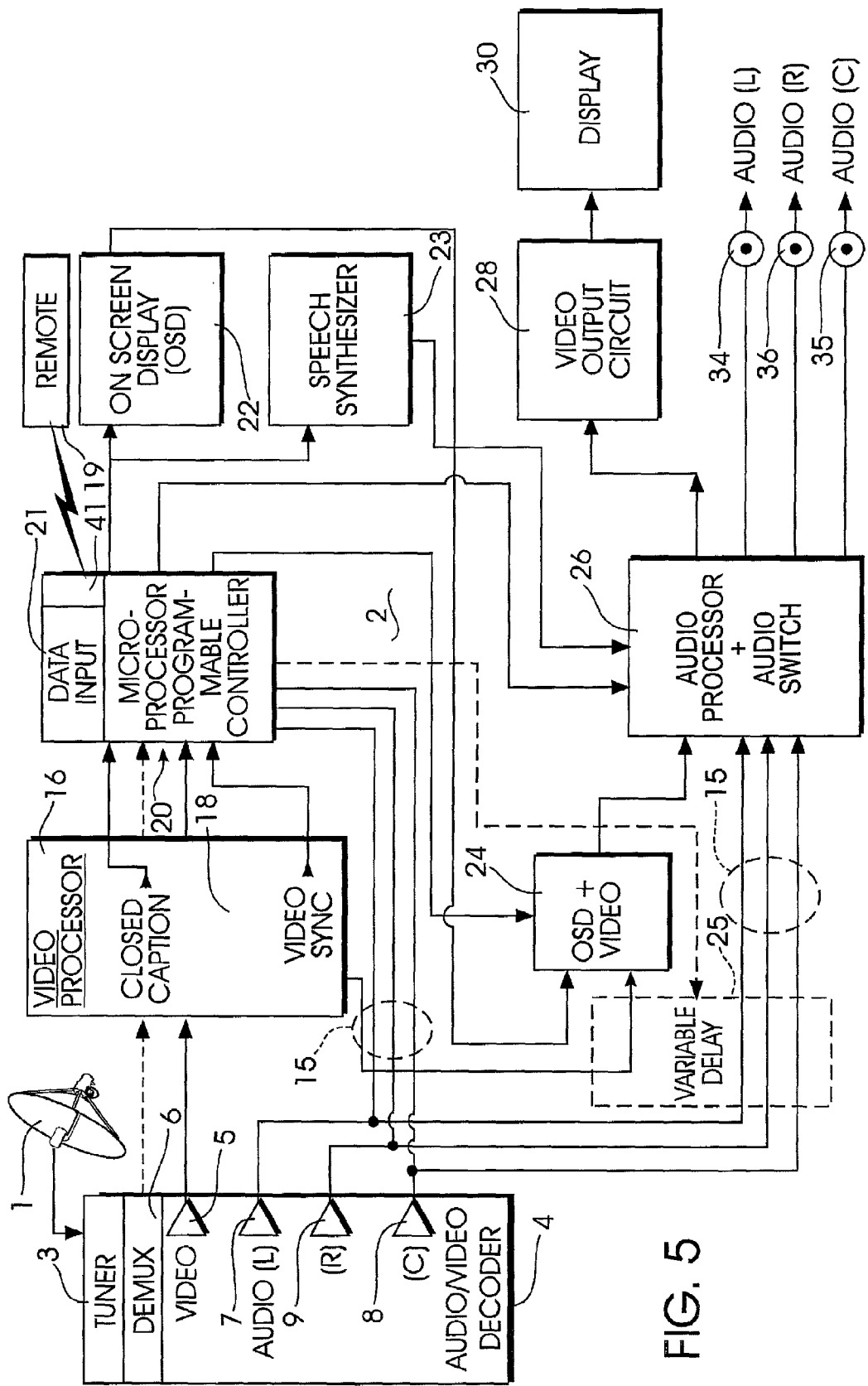
FIG. 5 is a schematic block diagram of an embodiment wherein the language filter apparatus is incorporated within digital TV circuitry rather than being free-standing.

Referring to FIG. 5, the automatic language filter 2 is supplied with radio frequency signals from an antenna 1. It is understood that the source of these signals may be a satellite or ground transmitter for a digital or analog broadcast television program which is received by an appropriate tuner 3. An audio/video decoder 4 has video output 5 connected to a video processor 16 and has one or more of left, center and right outputs 7, 8, and 9 connected to audio inputs of an audio processor and switch 26. Video processor 16 provides a closed caption signal and a video sync signal to microprocessor programmable controller 20. These are all known, conventional functions in the television art. Basically, closed caption data is digital control and closed caption text signals. These are found in the analog television retrace intervals, but it will be understood that this embodiment is primarily adapted for use with current digital TV technology. With digital technology, analog closed caption data slicers are replaced by other components for compatibility with digital technology standards. The TV receiver with language filter of FIG. 5 could employ American standards (NTSC) for analog TV instead of or in addition to digital standards and PAL, or other standards could be accommodated.

FIG. 5 illustrates by way of specific example a digital television receiver having the function of receiving CS digital broadcasting while incorporating the language and filter apparatus of the present invention.

A CS broadcast wave utilizing communication satellite (CS) is sent to a CS tuner 3 by a CS antenna 1, where it undergoes high-frequency processing and demodulation. An output from the CS tuner 3 is sent to a DEMUX circuit 6, where packets of digital information are demodulated.

In the DEMUX circuit 6, the packets are classified into MPEG (Motion Picture Expert Group) data and attachment information such as program guide information. The MPEG data obtained by the classification in the DEMUX circuit 6 is sent to audio/video decoder 4. Attachment information and auxiliary information may be sent to a programmable controller 20.

The programmable controller 20 may include program memory composed of a flash memory, a non-volatile memory composed of an EEPROM (Electrically Erasable and Programmable ROM), and/or a volatile memory composed of a RAM. The details of such apparatus and their operation are well known in the art and disclosed in U.S. Pat. No. 6,317,162, for example. Such disclosure is incorporated by reference here.

Video processor 16 captures synchronizing signals of the video and provides them to microprocessor programmable controller 20 which also receives the closed caption data and optionally may receive the unprocessed video signal from output 5. Microprocessor programmable controller 20 also optionally receives left, center and right audio from outputs 7, 8, and 9 which are collectively labeled audio input 15.

Microprocessor programmable controller 20 has a data input unit 21 which through an infrared receiver or other receiving device has the capability of receiving command signals from a television remote or other source to facilitate the user in electing various options for selective control of the language filter as well as control of other TV receiver options. A television remote is indicated at 19.

The microprocessor programmable controller 20 has outputs to an onscreen display 22, a speech synthesizer 23, an audio processor and audio switch 26, and an OSD plus video combiner 24. It also has an output to an optional variable delay unit 25 (shown in dashed lines) if desired.

The output of onscreen display 22 is provided to OSD plus video combiner 24, the output of which is routed through an audio processor and switch 26 to video output circuit 28 and to display 30.

As an optional feature, a speech synthesizer 23 is provided which produces an audible voice representation of the modified closed caption signal and such audible representation is provided to audio processor and switch 26, making it possible to switch in an audible representation of the modified closed caption segment in the audio path rather than simply muting the audio signal.

An audio path indicated at 15 permits the left, right and center audio outputs indicated at 7, 8, and 9 to proceed to audio processor and audio switch 26, and thence to left, right and center audio outputs 34, 36, and 35. Use of the center audio output 35 is optional. In the digital embodiment of FIG. 5, digital audio processing of conventional form is provided. The audio outputs 34, 35, and 36 may be provided in a form that facilitates direct connection to a digital or analog high-fidelity sound system.

The block diagrams in FIGS. 1, 2, and 5 are presented to facilitate understanding of a language filter for home TV, but it should be appreciated that the system shown in FIGS. 1 and 2 will be implemented for the most part with an integrated circuit microprocessor with appropriate programming for executing the functions of the blocks illustrated in FIGS. 1 and 2. At the same time, the technology employed for items such as the closed caption data slicer 16, the video sync separator 18, the on-screen display 22, the speech synthesizer 23, the closed caption editor 47, the speech recognizer 49, etc. will conform to those well-known in the television and computer arts. In respect to the closed caption editor 47, libraries 51, and operations and mode controller 45, technology utilized in the TV Guardian product produced by Principle Solutions of Rogers, Ark., and that disclosed in U.S. Pat. No. 6,166,780 issued to Bray may be utilized in part.

In advanced forms of the device, a variable delay 25 of conventional form gives greater assurance that the spoken text in the audio is not transmitted before objectionable words are detected by the closed caption editor 47. Speech recognizer 49 may aid in determining the appropriate delay by variable delay 25 for optimum operation.

Conventional RF modulator 28 is provided so that a television receiver without video frequency and audio frequency inputs may be utilized with the language filter. The RF modulator may produce radio frequency television signals with or without audio incorporated as may be desired and a switch may be provided for selecting between various options.

Although the operation of the language filter for TV is believed to be apparent from the preceding description, the following recapitulation of the functions of the apparatus may be helpful in understanding the interrelations of the apparatus.

The language filter for TV is provided with a conventional power supply which is not illustrated in the drawings for simplicity and clarity. The number and type of connectors that are provided for input and output to the language filter for TV is subject to wide variation and may be selected to suit the needs of particular areas or classes of consumers in accordance with standard practice in the industry. Specifically, connectors employed may be separate audio and separate video RCA-type connectors or separate or composite-type connectors of other forms may be employed. As illustrated, there are three audio channels—left, right and center—but the number of channels could be greater or lesser and may be particularly adapted for compatibility with sound systems such as "Dolby Surround Sound" or others.

It will further be understood that the VCR/DVD 3 may be any source of video and audio inputs including a cable box, or satellite antenna system as in the alternative preferred embodiment of FIG. 5. Furthermore, the language filter for home TV may be modified to include a converter to accept radio frequency (RF) television signals and produce separate video and audio from such signals. In a similar manner, the apparatus and function of the language filter for home TV may be built into a television receiver, a VCR, or a combination or variation thereof, see FIG. 5. When the language filter for home TV is combined with other audio/visual processing apparatus, some functions that are common may be shared thereby avoiding duplication of the same or similar components. The scope of the invention should be considered to include combination television and language filter apparatus as shown in FIG. 5 as well as the apparatus illustrated and described in FIG. 1.

In operation the apparatus illustrated and described will be connected with a television monitor and audio output devices in a straightforward manner. It should be pointed out that in different countries and different areas, there are different standards for television transmission (such as the PAL system in Europe and elsewhere). It is understood that the language filter may be designed to be compatible with the television standards of the United States or those of Europe or other countries using the PAL system. If desired, it is also feasible to provide a language filter for home TV which is switchable for use between different standards of television transmission and/or power connection. It should be understood that reference herein to "closed caption" contemplates that this will include similar video-coordinated spoken language information such as different language subtitles, same language subtitles or the like.

In operation of the language filter for home TV will have a default set of options such as moderate strictness, language editing, partial display of closed caption, etc. These may be changed by use of the control panel 55 or by the remote 19. The parent or other supervisory user will be provided with a PIN number which must be entered per menu instructions before changing the options for language filtering or turning off the language filter. This prevents the viewers being supervised from changing the filter options or turning off the filter against the wishes of the parental supervisor.

While separate memories could be used to store the multiple libraries of the system, it is preferred to have a master library with all words that are to be recognized and with designator codes for each word to denote assignment to a sub-library such as strict control, moderate control, religious programming, etc. Thus, it will be understood that reference to multiple libraries includes such virtual libraries formed by codes or tags for words in a master library.

With such a system of master library and virtual sub-libraries, it is effective to allow the user to employ menus to select a word to determine what library or libraries it is included in. The user can also (subject to password control) change the designator for a word to include or exclude it or select replacement words from a sub-library.

Provision may be made to deter "wiring around" the language filter when it is in a separate unit.

As previously described, important advantages of the present invention reside in the numerous options available, including multiple libraries or different degrees of editing and different modes of substitution of acceptable words and phrases, also including non-English language capability. In advanced forms of the system, the option may be selected of modifying the audio, instead of merely muting objectionable segments in order to replace such segment with a speech synthesized modified vocal segment.

From the foregoing description and explanation, it will be seen that the present language filter for home TV provides particularly convenient and effective apparatus for parental control of language presented to a child or other supervised viewer, including numerous options with respect to closed caption editing and sound and display presentations. In addition to the various modifications and variations of the invention described and suggested above, other modifications will be apparent to those skilled in the art and the scope of the invention is not to be considered to be limited to any specific embodiments and variations thereof illustrated and described.

What is claimed is:

1. Home television apparatus for processing an analog or digital electronic signal including an audio portion, a video portion, a spoken component portion related to the audio portion, an auxiliary information component and an on-screen display, said apparatus comprising:
    a text generator connected to receive a portion of said electronic signal to produce a text representation of said spoken component portion;
    a video path by which video portions of said electronic signal are processed and made available to a user display;
    an audio path by which audio portions of said electronic signal are processed and made available to a user audio output device;
    a programmable controller with a data memory including at least one text library;
    said programmable controller having a text editor for analyzing said text representation to determine if said spoken component contains words corresponding to undesirable words or phrases stored in a selected library of said memory;
    said text editor being configured to replace any detected undesirable word or phrase with another word, phrase, or blank space from a selected library of said memory to produce a modified spoken component including a modified text signal for said on-screen display;

an audio switch in said audio path for selectively modifying a corresponding audio portion of said electronic signal if undesirable words or phrases are detected within a segment of a spoken component portion;

said audio switch being controlled to cease modifications at the conclusion of said segment; and an on-screen display connected in said video path to produce a video display component representing said modified text signal;

a video display unit connected to receive said video portions of the electronic signal including said video display component.

2. The apparatus as recited in claim 1, wherein said programmable controller is adapted to selectively provide different modes of operation with respect to the displaying of said modified spoken component which include:

(1) a full captioning mode in which all modified or unmodified text information data are displayed;

(2) a normal captioning mode in which only modified text information data which represent the replacement words or phrases are displayed; and, (3) a no-captioning mode in which no word or phrase is displayed.

3. Apparatus as recited in claim 1, wherein undesirable words or phrases are stored in at least one library memory and characters of text representation segments are compared with characters of such undesirable words or phrases for detection thereof.

4. Apparatus as recited in claim 3, wherein substitute inoffensive words are contained in a library memory with reference pointers to undesirable words or phrases they should replace.

5. Apparatus as recited in claim 2 further including a speech synthesizer arranged to produce a spoken audio portion corresponding to said modified closed caption signal text and said audio switch is controllable by said operations and mode controller to insert synthesized speech audio for selected segments of the audio portion of said electronic signal.

6. Apparatus as recited in claim 1, wherein said programmable controller includes an on-screen menu generator and an infrared signal receiver and interface for receiving program instructions from a conventional television remote control unit.

7. Apparatus as recited in claim 2 further including a speech recognizer connected to receive said electronic signal audio portion and produce digitally-coded signals wherein undesirable words or phrases can be recognized by said text editor.

8. Television apparatus for processing a digital electronic signal including an audio portion, a video portion, a spoken component portion related to the audio portion, an auxiliary information component and an on-screen display, said apparatus comprising:

a text generator connected to receive a portion of said digital electronic signal to produce a text representation of said spoken component portion;

a video path by which video portions of said digital electronic signal are processed and made available to a user display;

an audio path by which audio portions of said digital electronic signal are processed and made available to a user audio output device;

a programmable controller with a data memory including at lest one text library;

said programmable controller having a text editor for analyzing said text representation to determine if said spoken component contains words corresponding to undesirable words or phrases stored in a selected library of said memory;

said text editor being configured to replace any detected undesirable word or phrase with another word, phrase, or blank space from a selected library of said memory to produce a modified spoken component including a modified text signal for an on-screen display;

an audio switch in said audio path for selectively modifying a corresponding audio portion of said electronic signal if undesirable words or phrases are detected within a segment of a spoken component portion; and an on-screen display connected in said video path to produce a video display component representing said modified text signal;

a video display unit connected to receive said video portions of said electronic signal including said video display component.

9. The apparatus as recited in claim 8, wherein said programmable controller is adapted to selectively provide different modes of operation with respect to the displaying of said modified spoken component which include:

(1) a fully captioning mode in which all modified or unmodified text information data are displayed;

(2) a normal captioning mode in which only modified text information data which represent the replacement words or phrases are displayed; and, (3) a no-captioning mode in which no word or phrase is displayed.

10. Apparatus as recited in claim 8, wherein undesirable words or phrases are stored in at least one library memory and characters of text representation segments are compared with characters of such undesirable words or phrases for detection thereof.

11. Apparatus as recited in claim 10, wherein substitute inoffensive words are contained in a library memory with reference pointers to undesirable words or phrases they should replace.

12. Apparatus as recited in claim 9 further including a speech synthesizer arranged to produce a spoken audio portion corresponding to said modified text and said audio switch is controllable by said operations and mode controller to insert synthesized speech audio for selected segments of the audio portion of said electronic signal.

13. Apparatus as recited in claim 8, wherein said programmable controller includes an on-screen menu generator and an infrared signal receiver and interface for receiving program instructions from a conventional television remote control unit.

14. Apparatus as recited in claim 9 further including a speech recognizer connected to receive said electronic signal audio portion and produce digitally-coded signals wherein undesirable words or phrases can be recognized by said text editor.

* * * * *